(12) United States Patent
Blasius et al.

(10) Patent No.: US 8,510,150 B2
(45) Date of Patent: Aug. 13, 2013

(54) FIBER TO THE PREMISES NETWORK MODELING SYSTEMS AND METHODS

(75) Inventors: Michael R. Blasius, Flower Mound, TX (US); Jonathan Allen, Coppell, TX (US)

(73) Assignee: Verizon North LLC, Philadelphia, PA (US)

( * ) Notice: Subject to any disclaimer, the term of this patent is extended or adjusted under 35 U.S.C. 154(b) by 49 days.

(21) Appl. No.: 13/041,306

(22) Filed: Mar. 4, 2011

(65) Prior Publication Data

US 2012/0226520 A1 Sep. 6, 2012

(51) Int. Cl.
*G06Q 10/00* (2012.01)
(52) U.S. Cl.
USPC ....... 705/7.29; 705/7.31; 705/7.33; 705/7.34; 705/7.35
(58) Field of Classification Search
USPC .............. 705/7.29, 7.31, 7.33, 7.34, 7.35
See application file for complete search history.

(56) References Cited

U.S. PATENT DOCUMENTS

| 2007/0112575 | A1* | 5/2007 | Savoor et al. | 705/1 |
| 2007/0242608 | A1* | 10/2007 | Ou et al. | 370/238 |
| 2010/0117857 | A1* | 5/2010 | Russell et al. | 340/870.02 |
| 2011/0311226 | A1* | 12/2011 | Smith et al. | 398/45 |
| 2012/0065944 | A1* | 3/2012 | Nielsen et al. | 703/1 |

\* cited by examiner

*Primary Examiner* — Thomas Dixon
*Assistant Examiner* — Gerald Vizvary

(57) ABSTRACT

An exemplary method includes a fiber to the premises ("FTTP") network modeling system assigning a cost factor to each of a plurality of street segments within a geospatial polyline map of a fiber optic network service area, receiving input representative of a geospatial location of each of a plurality of FTTP demand sites, automatically determining a least cost path along one or more of the street segments for each of the FTTP demand sites to a central office included in the FTTP network in accordance with the assigned cost factors, automatically determining a demand associated with each street segment included in the plurality of street segments; and automatically determining a geospatial location and a size of a plurality of fiber distribution hubs to be included in the FTTP network. Corresponding methods and systems are also disclosed.

20 Claims, 12 Drawing Sheets

Street Segments

| Street Segment | Length (ft) | Cost Factor |
|---|---|---|
| 14 | 723 | 1.0 |
| 15 | 398 | 0.7 |
| 16 | 1,184 | 1.0 |
| 17 | 2,560 | 0.6 |
| 18 | 1,162 | 0.6 |
| 19 | 521 | 1.2 |
| 20 | 936 | 1.5 |

Fig. 5

FTTP Demand Sites

| Address | City | State | Zip | Latitude | Longitude | Premises Type |
|---|---|---|---|---|---|---|
| 111 Dove St. | Dallas | tx | 75068 | 33.1735 | -96.9155 | SDU |
| 113 Dove St. | Dallas | tx | 75068 | 33.1392 | -97.3053 | SDU |
| 115 Dove St. | Dallas | tx | 75068 | 33.1733 | -97.2295 | SDU |
| 3332 Snow Ct. | Dallas | tx | 75068 | 33.1655 | -96.9729 | SDU |
| 3700 Snow Ct. | Dallas | tx | 75068 | 33.4137 | -97.1064 | MDU |
| 3241 State St. | Dallas | tx | 75068 | 33.2202 | -97.0964 | MDU |
| 3255 State St. | Dallas | tx | 75068 | 33.1596 | -97.0612 | DFS |

Fig. 6

Model Results

| | |
|---|---|
| SDUs | 4,055 |
| MDUs | 532 |
| Direct Fiber Demand Sites | 19 |
| Feeder Fiber Demand | 1.64M ft. |
| Distribution Fiber Demand | 2.21M ft. |
| FDHs | 69 |
| Total Cost | $1.26 Billion |

Fig. 11

FIBER TO THE PREMISES NETWORK MODELING SYSTEMS AND METHODS

BACKGROUND INFORMATION

Fiber to the premises ("FTTP") refers to a type of network architecture that utilizes fiber optic cables and associated optical electronics instead of copper wire to connect customers to a network. When compared to copper wire, FTTP provides practically unlimited bandwidth for an array of Internet-based data, video, and voice applications.

Implementation of an FTTP network requires careful planning, oversight, and cost analysis. For example, when building an FTTP network from scratch, FTTP network providers often have to ensure seamless integration of the FTTP network components with existing or to-be-built infrastructure, comply with government regulations, and determine whether it is cost effective to provide fiber optic service to a particular geographic region and/or potential customer. Hence, it is often desirable to model the FTTP network before it is built.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 5 shows an exemplary GUI that includes an editable table configured to facilitate manual assignment of one or more cost factors to one or more street segments according to principles described herein.

FIG. 6 shows an exemplary GUI that includes a table of geospatial information associated with a plurality of FTTP demand sites according to principles described herein.

FIG. 11 shows an exemplary GUI that includes various model results according to principles described herein.

DETAILED DESCRIPTION OF PREFERRED EMBODIMENTS

Methods and systems for modeling an FTTP network are described herein. As described in more detail below, an FTTP network modeling system may be configured to assign a cost factor to each of a plurality of street segments within a geospatial polyline map of a fiber optic network service area, receive input representative of a geospatial location of each of a plurality of FTTP demand sites, and automatically determine a least cost path along one or more of the street segments for each of the FTTP demand sites to a central office included in the FTTP network in accordance with the assigned cost factors. The FTTP network modeling system may be further configured to automatically determine, based on the geospatial location of each of the FTTP demand sites and on the automatically determined least cost paths, a demand associated with each street segment included in the plurality of street segments. The FTTP network modeling system may be further configured to automatically determine, based on the automatically determined demand associated with each street segment included in the plurality of street segments and in accordance with a predetermined hub size selection heuristic, a geospatial location and a size of a plurality of fiber distribution hubs to be included in the FTTP network.

The FTTP network modeling methods and systems described herein may allow FTTP network providers to effectively model a FTTP network before it is built, select an optimal combination of components to be included in the FTTP network, and accurately determine a cost associated with building the FTTP network.

Figure 1:
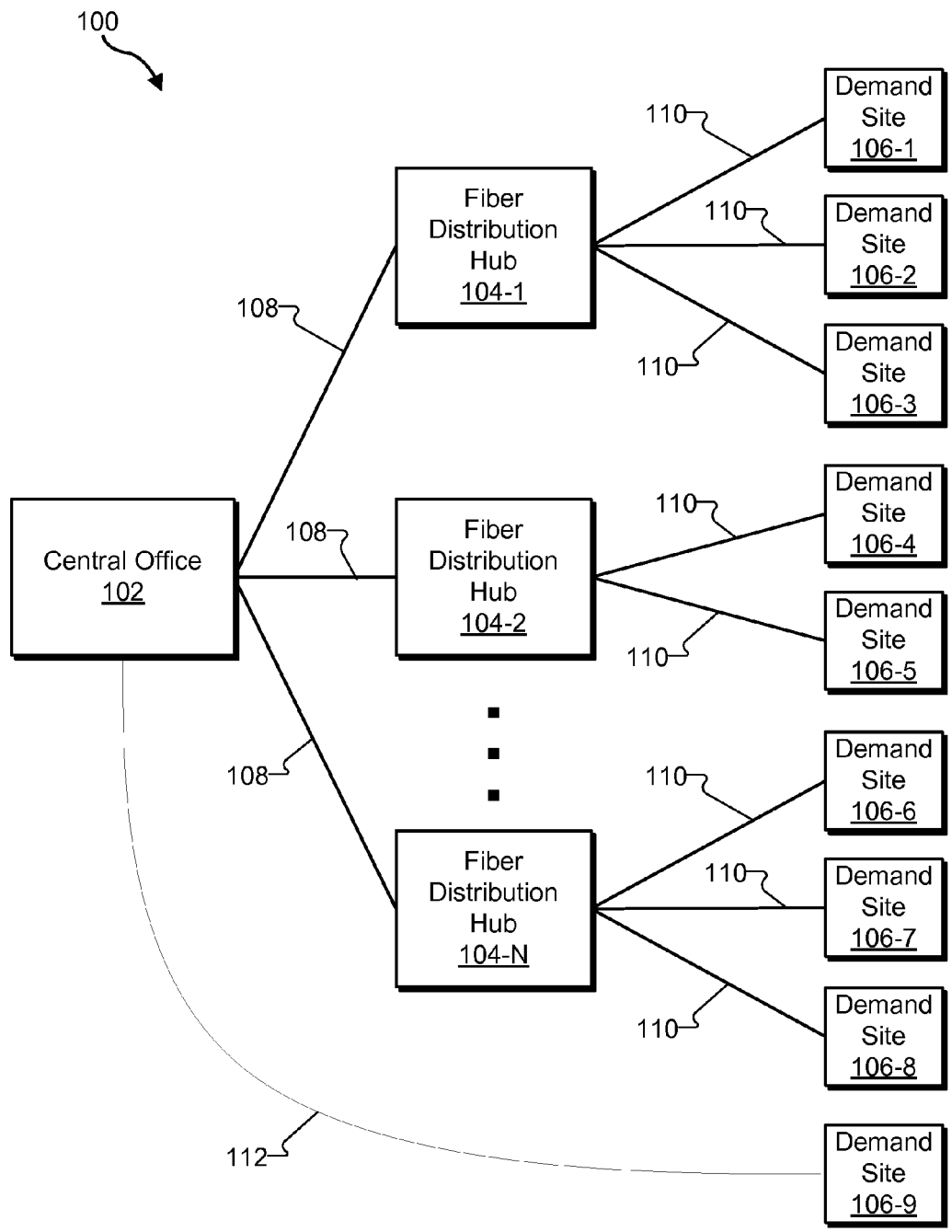
FIG. 1 illustrates an exemplary FTTP network.

To facilitate an understanding of the methods and systems described herein, an exemplary FTTP network 100 associated with a particular fiber optic network service area is illustrated in FIG. 1. FTTP network 100 may alternatively be referred to as a "fiber to the home network" or as a "fiber to the building network."

As shown in FIG. 1, FTTP network 100 may include a central office ("CO") 102, a plurality of fiber distribution hubs ("FDHs") 104 (e.g., fiber distribution hubs 104-1 through 104-N), a plurality of demand sites 106 (e.g., demand sites 106-1 through 106-9), a plurality of fiber optic cables (e.g., fiber optic feeder cables 108, fiber optic distribution cables 110, and fiber optic cable 112). It will be recognized that FTTP network 100 may include additional or alternative components and/or infrastructure as may serve a particular implementation. Each of the components illustrated in FIG. 1 will now be briefly described.

Central office 102 may include a physical building used to house inside plant equipment (e.g., an optical line terminal) associated with FTTP network 100. Fiber distribution hubs 104 may be positioned at various locations within the fiber optic network service area and are configured to house one or more optical splitters. Demand sites 106 may include one or more buildings or structures to which it is desirable to provide fiber optic network service. For example, a demand site 106 may include a single dwelling unit ("SDU") (e.g., a house), a multi-dwelling unit ("MDU") (e.g., an apartment building), a business entity, or a direct fiber demand site (i.e., a site (e.g., demand site 106-9) to which one or more dedicated optical fibers (e.g., fiber optic cable 112) are to be run without being optically split).

In many FTTP network configurations, it is infeasible to run a dedicated fiber optic cable to each demand site 106. Hence, as shown in FIG. 1, a plurality of fiber optic cables referred to as "fiber optic feeder cables" (or simply "feeder fiber") 108 may be run from central office 102 to fiber distribution hubs 104. The optical splitters within fiber distribution hubs 104 may optically split feeder fiber 108 and pass a plurality of fiber optic distribution cables (or simply "distribution fiber") 110 to each individual demand site 106 (e.g., demand sites 106-1 through 106-8).

Fiber distribution hubs 104 and fiber optic cables 108, 110, and 112, as well as any other network infrastructure located outside central office 102 may be referred to as being part of a FTTP "outside plant" network. As will be described below, the FTTP network modeling methods and systems described herein are configured to model a FTTP network by automatically generating data descriptive of a proposed layout and/or cost associated with a FTTP outside plant network. For example, the FTTP network modeling methods and systems described herein may automatically generate data descriptive of a least cost path associated with fiber optic cables 108, 110, and 112 (i.e., data descriptive of where each of fiber optic cables 108, 110, and 112 should be run in order to minimize cost associated with laying optic fiber cables 108, 110, and 112). The FTTP network modeling methods and systems described herein may be further configured to automatically generate data descriptive of a quantity and size of fiber cables 108, 110, and 112, a quantity, location, and size of fiber distribution hubs 104, and/or any other data associated with the FTTP outside plant network as may serve a particular implementation. Based on this generated data, the FTTP network modeling methods and systems described herein may accurately estimate the amount of resources (e.g., materials, labor, and/or cost) required to build an FTTP network.

It will be recognized that FTTP network 100 may have various optical limit constraints associated therewith. For example, a particular demand site (e.g., demand site 106-1) may have to be within a predetermined distance of a fiber distribution hub (e.g., fiber distribution hub 104-1) and/or central office 102. Hence, the FTTP network modeling methods and systems described herein may be configured to operate within these optical limit constraints.

Figure 2:
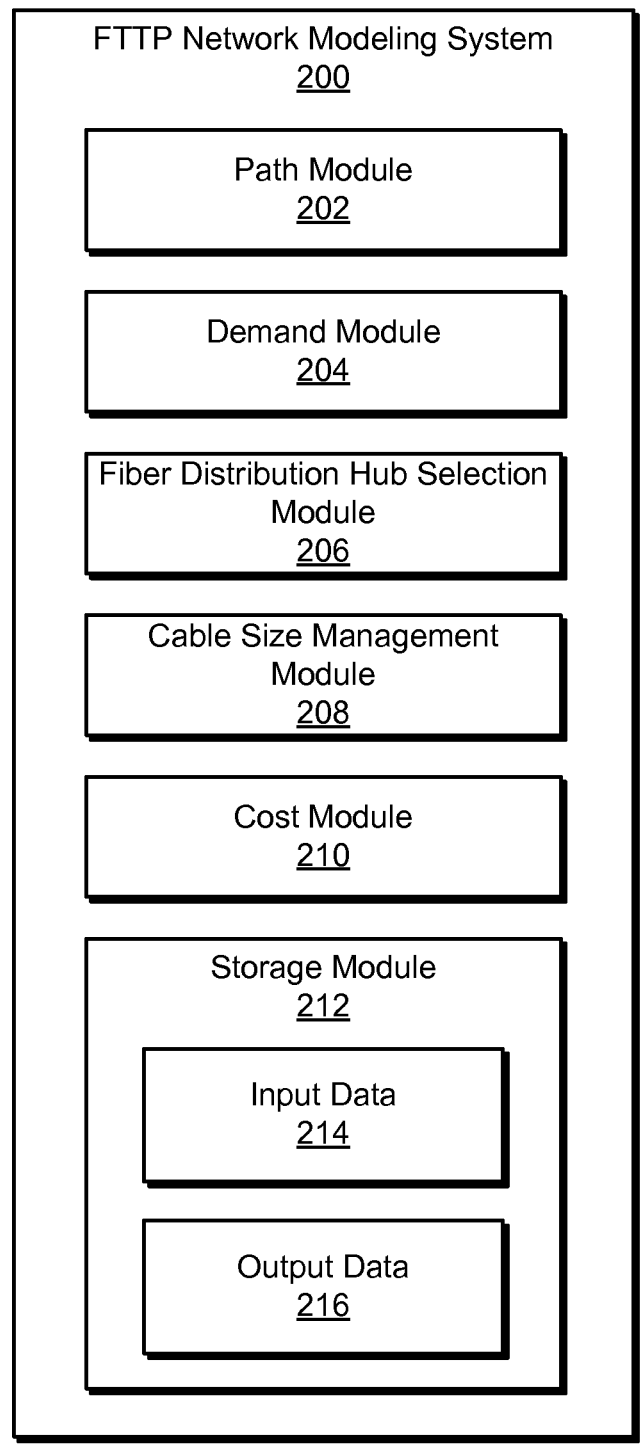
FIG. 2 illustrates an exemplary FTTP network modeling system according to principles described herein.

FIG. 2 illustrates an exemplary FTTP network modeling system 200 (or simply "system 200"). System 200 may be configured to model an FTTP network (e.g., FTTP network 100) corresponding to a particular fiber optic network service area. As shown, system 200 may include a path module 202, a demand module 204, a fiber distribution hub selection module 206, a cable size management module 208, a cost module 210, and a storage module 212, which may be in communication with one another using any suitable communication technologies. In some examples, one or more of these modules may be implemented by one or more computing devices configured to operate in accordance with a MapInfo or other suitable programming language and/or database format.

Path module 202 may be configured to automatically determine a least cost path for each of a plurality of FTTP demand sites within the fiber optic network service area to a central office. In other words, path module 202 may be configured to automatically determine an optimal route (from a cost perspective) along which fiber optic cable may be run from the central office to each FTTP demand site.

In some examples, each least cost path may run along a plurality of street segments included in the fiber optic network service area. Hence, in order to determine the least cost paths, path module 202 may be configured to assign a cost factor to each of a plurality of street segments within a geospatial polyline map of a fiber optic network service area. Each cost factor represents a cost of running a fiber optic cable along its corresponding street segment. Path module 202 may be further configured to receive input representative of a geospatial location of each of a plurality of FTTP demand sites and automatically determine a least cost path along one or more of the street segments for each of the FTTP demand sites in accordance with the assigned cost factors.

In some examples, path module 202 may assign the cost factors to the street segments in response to user input. For example, as will be described below, a user may provide input representative of a particular cost factor that should be associated with a particular street segment. In response to receiving the input, path module 202 may assign the particular cost factor to the particular street segment.

Additionally or alternatively, a value of one or more cost factors may be automatically determined by path module 202. For example, path module 202 may automatically determine a value of a cost factor that should be associated with a particular street segment based on one or more geospatial properties of the particular street segment. For example, a relatively low cost factor may be automatically assigned to a street segment that is relatively easy to access (e.g., a highway). Similarly, a relatively high cost factor may be assigned to a street segment that is relatively difficult to access (e.g., a street segment surrounded by existing infrastructure that cannot be disturbed).

Path module 202 may use any suitable least cost path heuristic to determine the least cost paths associated with the demand sites. To illustrate, path module 202 may utilize a least cost path heuristic based on one or more Dijkstra heuristics. In some examples, path module 202 may determine the least cost paths within one or more predetermined optical limit constraints associated with the FTTP network.

Demand module 204 may be configured to automatically determine, based on the geospatial location of each of the FTTP demand sites and on the automatically determined least cost paths, a demand associated with each street segment included in the plurality of street segments. As used herein, a "demand" associated with a particular street segment may refer to a total number of demand sites served by fiber run along the particular street segment, a feeder fiber demand associated with the particular street segment (i.e., a number and/or length of fiber optic feeder cables that are to be associated with (i.e., run along) the particular street segment), a distribution fiber demand associated with the particular street segment (i.e., a number and/or length of fiber optic distribution cables that are to be associated with the particular street segment), a direct fiber demand associated with the particular street segment (i.e., a number and/or length of dedicated fibers that are to be associated with the particular street segment), and/or any other FTTP network demand as may serve a particular implementation. An example of automatically determining a demand associated with each street segment will be provided below.

Fiber distribution hub selection module 206 may be configured to automatically determine a geospatial location and a size of a plurality of fiber distribution hubs to be included in the FTTP network. In some examples, the determination may be based on the automatically determined demand associated with each street segment and performed in accordance with a predetermined hub size selection heuristic. It will be recognized that various sizes of fiber distribution hubs may be used in the FTTP network and that there may be many different potential locations for the fiber distribution hubs that are selected. Because of this, fiber distribution hub selection module 206 may be configured to automatically determine an optimal combination of fiber distribution hubs (from a cost and/or performance perspective) to be included in the FTTP network along with a potential placement location for each of the fiber distribution hubs. An example of automatically determining a geospatial location and a size of fiber distribution hubs will be provided below.

Demand module 204 and fiber distribution hub selection module 206 may be configured to function in conjunction with one another. For example, a demand associated with one or more street segments (e.g., a total number of customers or FTTP demand sites served by fiber optic cables associated with the one or more street segments) may be initially determined by demand module 204. The determined demand may be used by fiber distribution hub selection module 206 to select one or more fiber distribution hubs for inclusion in the FTTP network. Based on the size and location of the selected fiber distribution hubs, demand module 204 may calculate the fiber demand associated with the street segments affected by the placement of the fiber distribution hubs. This process may be repeated until an optimal fiber distribution hub configuration (i.e., a configuration that minimizes the amount of fiber optic cables that need to be run, the number of fiber distribution hubs, overall FTTP network cost, etc.) is obtained.

Cable size management module 208 may be configured to automatically determine one or more standard fiber optic cable sizes associated with the street segments. This determination may be based on the automatically determined demand associated with the one or more street segments. It will be recognized that various sizes of fiber optic cable exist, but that it may be desirable to standardize the size of fiber optic cable used to satisfy the feeder fiber demand and to standardize the size of fiber optic cable used to satisfy the feeder fiber demand. Hence, once the fiber demand (i.e., feeder fiber demand and distribution fiber demand) associated with the street segments has been determined, cable size management module 208 may automatically determine one or more standard sizes of fiber optic cables to be used in the FTTP network.

Cost module 210 may be configured to automatically calculate a cost of building the FTTP network. The calculation may be based on the automatically determined demand, the automatically determined geospatial location and size of each of the plurality of fiber distribution hubs, and/or any other factor as may serve a particular implementation. An exemplary manner in which cost module 210 may automatically calculate a cost of building the FTTP network will be described in more detail below.

One or more of modules 202-210 may be configured to provide one or more graphical user interfaces ("GUIs") for display (e.g., on a display screen that is a part of or connected to a computing device). Various GUIs that may be provided for display will be described in more detail below.

Storage module 212 may be configured to maintain input data 214 and output data 216. Input data 214 may be representative of data provided by a user and/or any other source. For example, input data 214 may include, but is not limited to, path input (e.g., input representative of a geospatial polyline map, one or more cost factors associated with one or more street segments, etc.), demand input (e.g., input representative of a geospatial location of a plurality of FTTP demand sites), direct fiber input (e.g., input representative of one or more direct fiber sites and/or other direct fiber requirements), general input (e.g., input representative of general design criteria such as one or more optical limit constraints, a maximum path reach of various types of optical splitters (e.g., 16:1 and/or 32:1 splitters), etc.), cable input (e.g., input representative of one or more standard fiber optic cable sizes), fiber distribution hub input (e.g., input representative of one or more possible fiber distribution hub sizes and service ranges, a preferred order of fiber distribution hub sizes, etc.), and/or any other type of input as may serve a particular implementation.

Input data 214 may be provided in any suitable format as may serve a particular implementation. In some examples, all of the input data 214 is provided in MapInfo format.

Output data 216 may include any suitable output provided by one or more of modules 202-210. For example, output data 216 may include, but is not limited to, demand data, fiber distribution hub data, cable data, and/or cost data. Demand data may be representative of a demand associated with each street segment. Fiber distribution hub data may include data associated with each fiber distribution hub included in the FTTP network. For example, for a particular fiber distribution hub, the fiber distribution hub data may include information representative of a location of the fiber distribution hub, a size of the fiber distribution hub, an identifier of the fiber distribution hub, a splitter ratio associated with the fiber distribution hub, a feeder fiber requirement associated with the fiber distribution hub, a distribution fiber requirement associated with the fiber distribution hub, and/or a number of FTTP demand sites associated with the fiber distribution hub. Cable data may be representative of fiber optic cable sizes associated with each street segment. Cost data may be representative of one or more costs associated with implementing the FTTP network.

Output data 216 may be output in any suitable format as may serve a particular implementation. In some examples, the output data 216 is output in the form of a single output file that is in MapInfo format.

Figure 3:
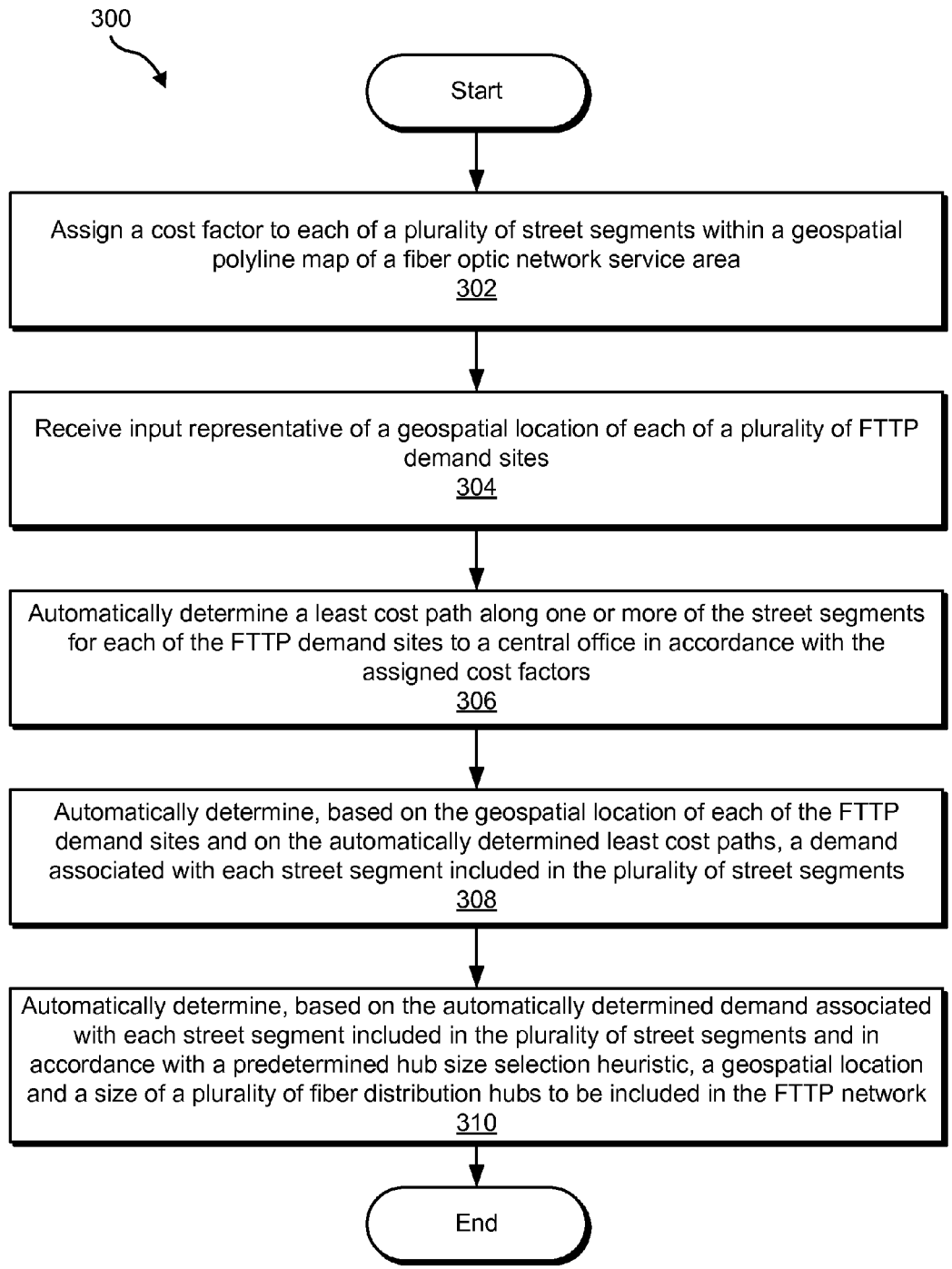
FIG. 3 illustrates an exemplary method of modeling an FTTP network according to principles described herein.

FIG. 3 illustrates an exemplary method 300 of modeling an FTTP network. While FIG. 3 illustrates exemplary steps according to one embodiment, other embodiments may omit, add to, reorder, and/or modify any of the steps shown in FIG. 3. The steps shown in FIG. 3 may be performed by any component or combination of components of system 200.

In step 302, a cost factor is assigned to each of a plurality of street segments within a geospatial polyline map of a fiber optic network service area. Step 302 may be performed in any suitable manner as may serve a particular implementation.

Figure 4:
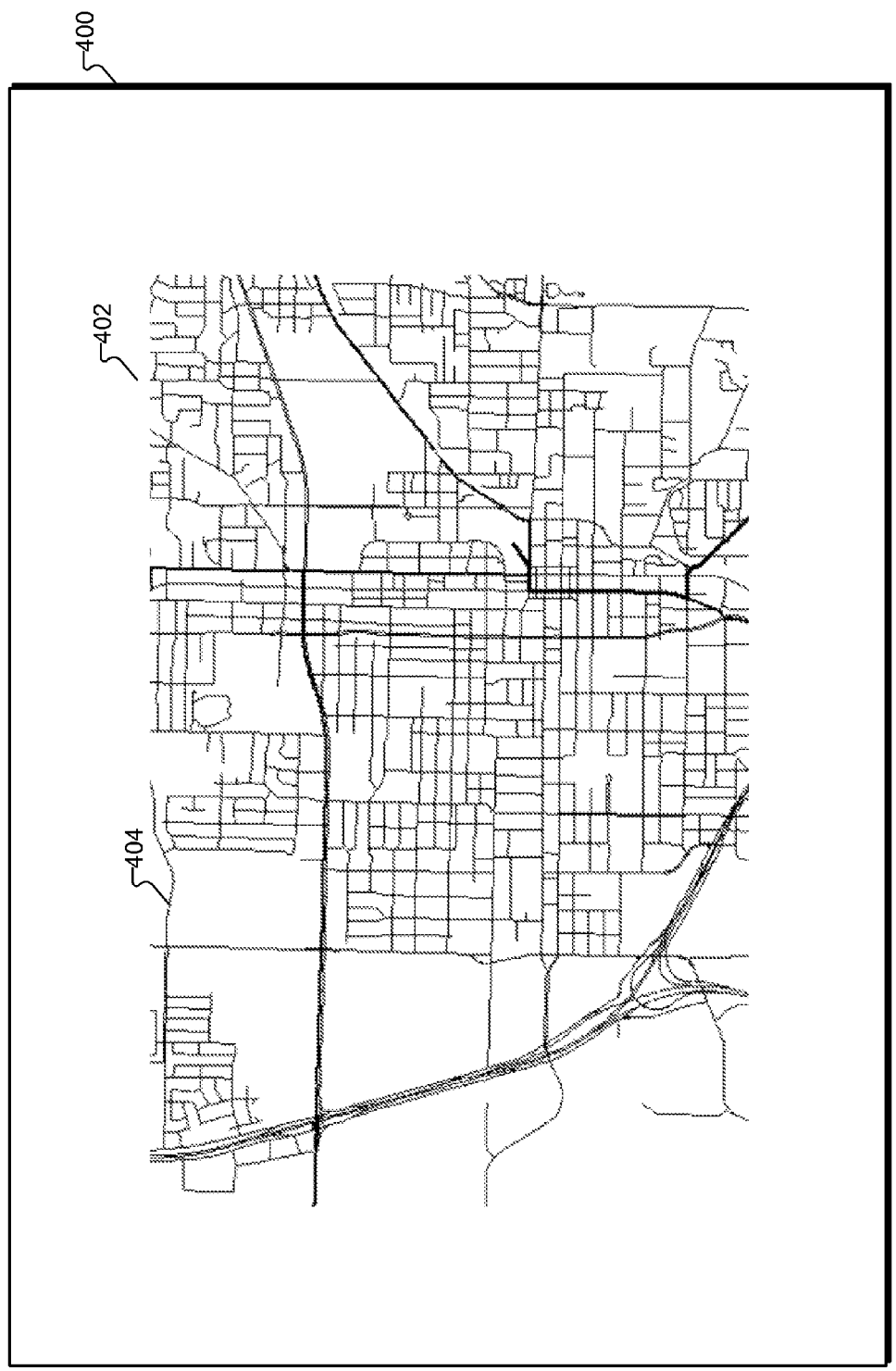
FIG. 4 shows an exemplary graphical user interface ("GUI") that includes a geospatial polyline map of a fiber optic service area according to principles described herein.

To illustrate, FIG. 4 shows an exemplary GUI 400 that may be provided by FTTP network modeling system 200 for display by a display device. As shown, GUI 400 includes a geospatial polyline map 402 of a fiber optic service area. In some examples, one or more other layers of information may be displayed on top of map 402. In this manner, a user may readily view various components of an FTTP network being modeled for the fiber optic service area.

Map 402 may include a plurality of street segments (e.g., street segment 404). Each street segment may include an entire street and/or any portion of a street (e.g., a portion of a street in between two intersections with other streets).

As described above, each street segment included within map 402 may be a potential path segment along which one or more fiber optic cables are to be run in the FTTP network. Hence, a cost factor may be assigned to each street segment so that a least cost path along one or more of the street segments may be determined for each of a plurality of FTTP demand sites. The cost factors may be assigned to the street segments in any suitable manner.

For example, FIG. 5 shows an exemplary GUI 500 that may be provided by system 200 and that includes a table 502 configured to facilitate manual assignment of one or more cost factors to one or more street segments. As shown, table 502 may include an identifier for each street segment, a length of each street segment, and a cost factor associated with each street segment. In some examples, system 200 may assign a default cost factor (e.g., 1.0) to each street segment. Subsequently, a user may modify one or more of the cost factors. For example, table 502 shows that the cost factor assigned to street segment 15 has been modified to be equal to 0.7. It will be recognized that table 502 is merely illustrative of the many different ways in which cost factors may be assigned to street segments. Moreover, it will be recognized that table 502 may have additional or alternative columns of information (e.g., information descriptive of a linking between each of the street segments).

Returning to FIG. 3, in step 304, input representative of a geospatial location of each of a plurality of FTTP demand sites is received. The input may be received in any suitable manner as may serve a particular implementation. To illustrate, FIG. 6 shows an exemplary GUI 600 that may be provided by system 200 and that includes a table 602 of geospatial information associated with a plurality of FTTP demand sites. As shown, table 602 may include a street address, a city, a state, a zip code, latitude and longitude coordinates, and a premises type value (e.g., SDU, MDU, or DFS (i.e., direct fiber site)) for each FTTP demand site.

In some examples, any of the entries included in table 602 may be input and/or modified manually by a user. Additionally or alternatively, one or more of the entries may be automatically input by system 200 in any suitable manner.

Figure 7:
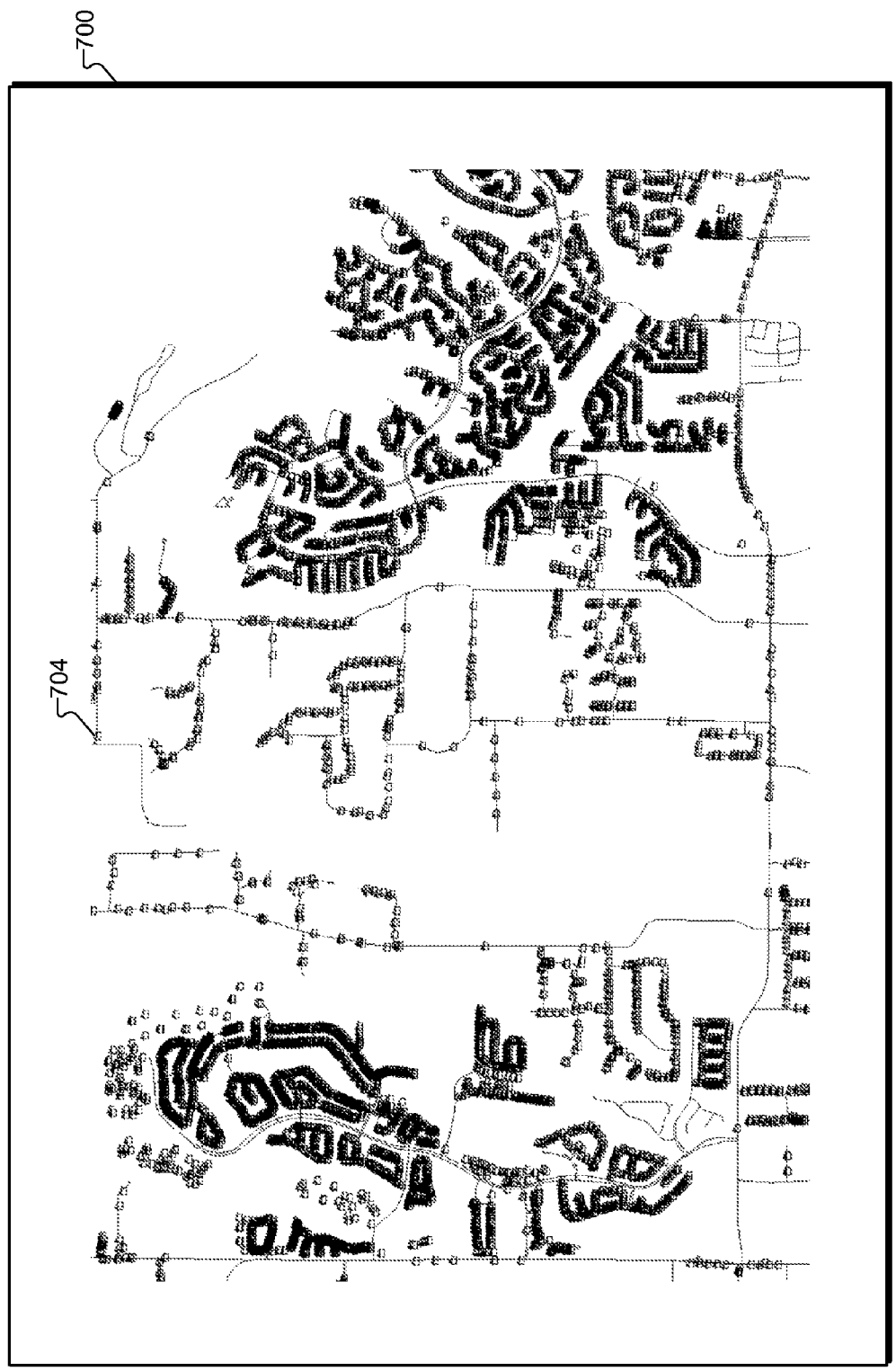
FIG. 7 shows an exemplary GUI that graphically illustrates a geospatial location of a plurality of FTTP demand sites.

FIG. 7 shows an exemplary GUI 700 that may be provided by system 200 and that graphically illustrates a geospatial location of a plurality of FTTP demand sites. As shown, the geospatial location of each FTTP demand site may be graphically represented by a graphical symbol (e.g., graphical symbol 704). GUI 700 may allow a user to readily determine where areas of demand are within the fiber optic network service area. For example, higher concentrations of graphical symbols indicate relatively higher concentrations of demand.

Returning to FIG. 3, in step 306, a least cost path along one or more of the street segments to a central office included in the FTTP network is automatically determined for each of the FTTP demand sites in accordance with the assigned cost factors. The least cost paths may be determined in any of the ways described herein.

Figure 8:
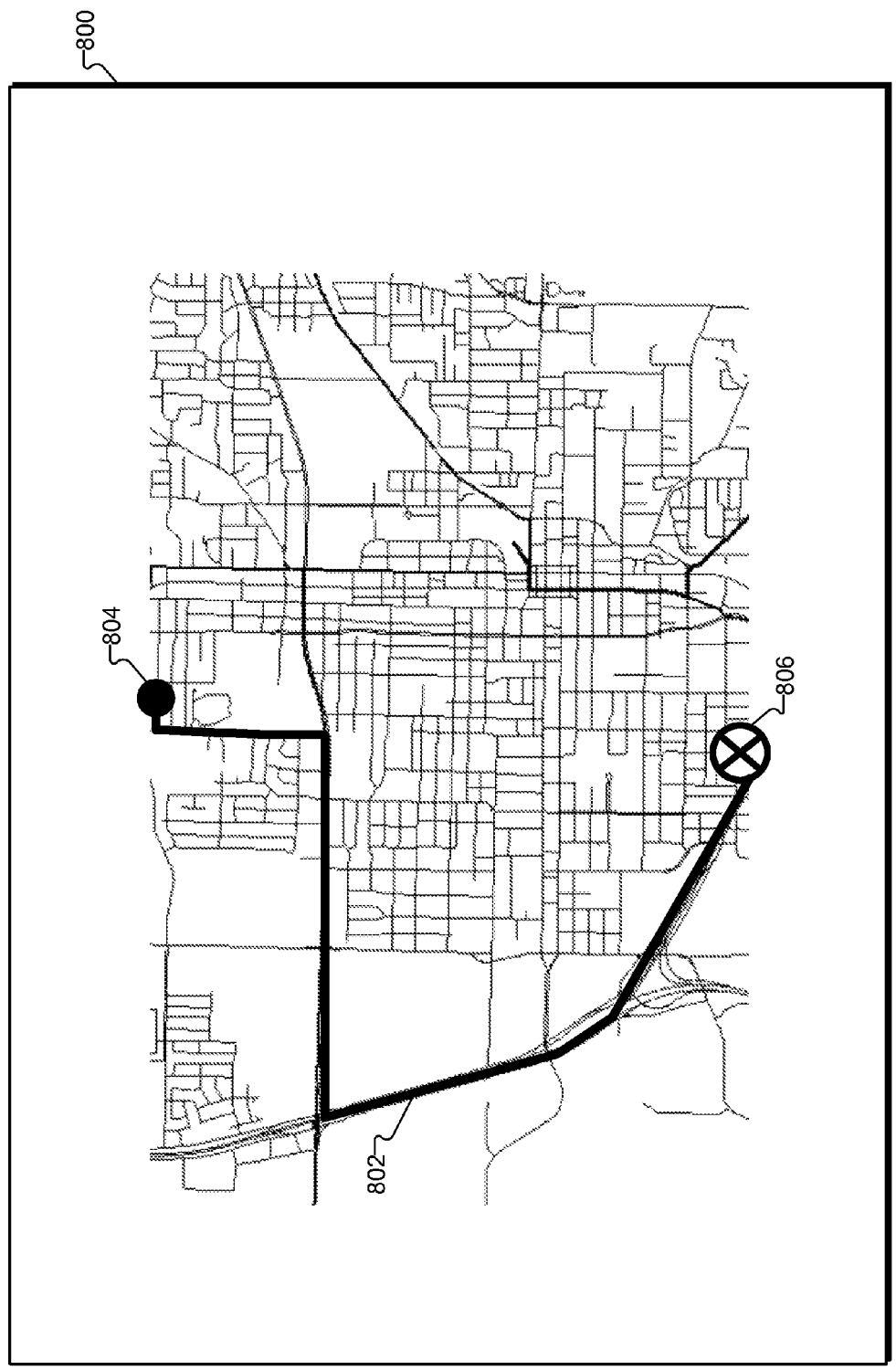
FIG. 8 shows an exemplary GUI that may graphically illustrate a least cost path for a particular FTTP demand site according to principles described herein.

To illustrate, FIG. 8 shows an exemplary GUI 800 that may be provided by system 100 and that may graphically illustrate a least cost path 802 for a particular FTTP demand site 804. As shown, the least cost path 802 runs along a plurality of street segments between FTTP demand site 804 and a central office 806. Because some street segments have lower cost factors than other street segments, the least cost path 802 may not necessarily be equivalent to the shortest distance path between FTTP demand site 804 and central office 806. This is illustrated in FIG. 8, which shows least cost path 802 being greater in distance than a more direct path to central office 806.

To determine a least cost path associated with a particular FTTP demand site, system 200 may iteratively select different potential paths and then determine an overall cost associated with each potential path in accordance with the cost factors assigned in step 302. The least cost paths may be alternatively determined in any other suitable way.

Returning to FIG. 3, in step 308, a demand associated with each street segment included in the plurality of street segments is automatically determined based on the geospatial location of each of the FTTP demand sites and on the automatically determined least cost paths. The demand may be automatically determined in any suitable manner as may serve a particular implementation.

For example, system 200 may determine that a particular street segment is the nearest street segment to a particular FTTP demand site. System 200 may then associate a demand of "one FTTP demand site" to that street segment. This demand is rippled (i.e., associated with) each street segment included in the least cost path for the FTTP demand site back to the central office. This process is may be repeated for each FTTP demand site until a total demand value for each street segment (e.g., a total number of FTTP demand sites served by one or more fiber optic cables associated with each street segment) is determined. In some examples, single dwelling unit demand associated with each street segment may be distinguished from multi-dwelling unit demand.

In step 310, a geospatial location and a size of a plurality of fiber distribution hubs to be included in the FTTP network are automatically determined based on the automatically determined demand associated with each street segment and in accordance with a predetermined hub size selection heuristic. The geospatial location and size of the fiber distribution hubs may be automatically determined in any suitable manner.

To illustrate, system 200 may receive user input that is representative of a preferred use order of fiber distribution hub sizes. The hub size selection heuristic may be configured to select an optimal size for each of the fiber distribution hubs to be included in the FTTP network based on the preferred use order.

Figure 9:
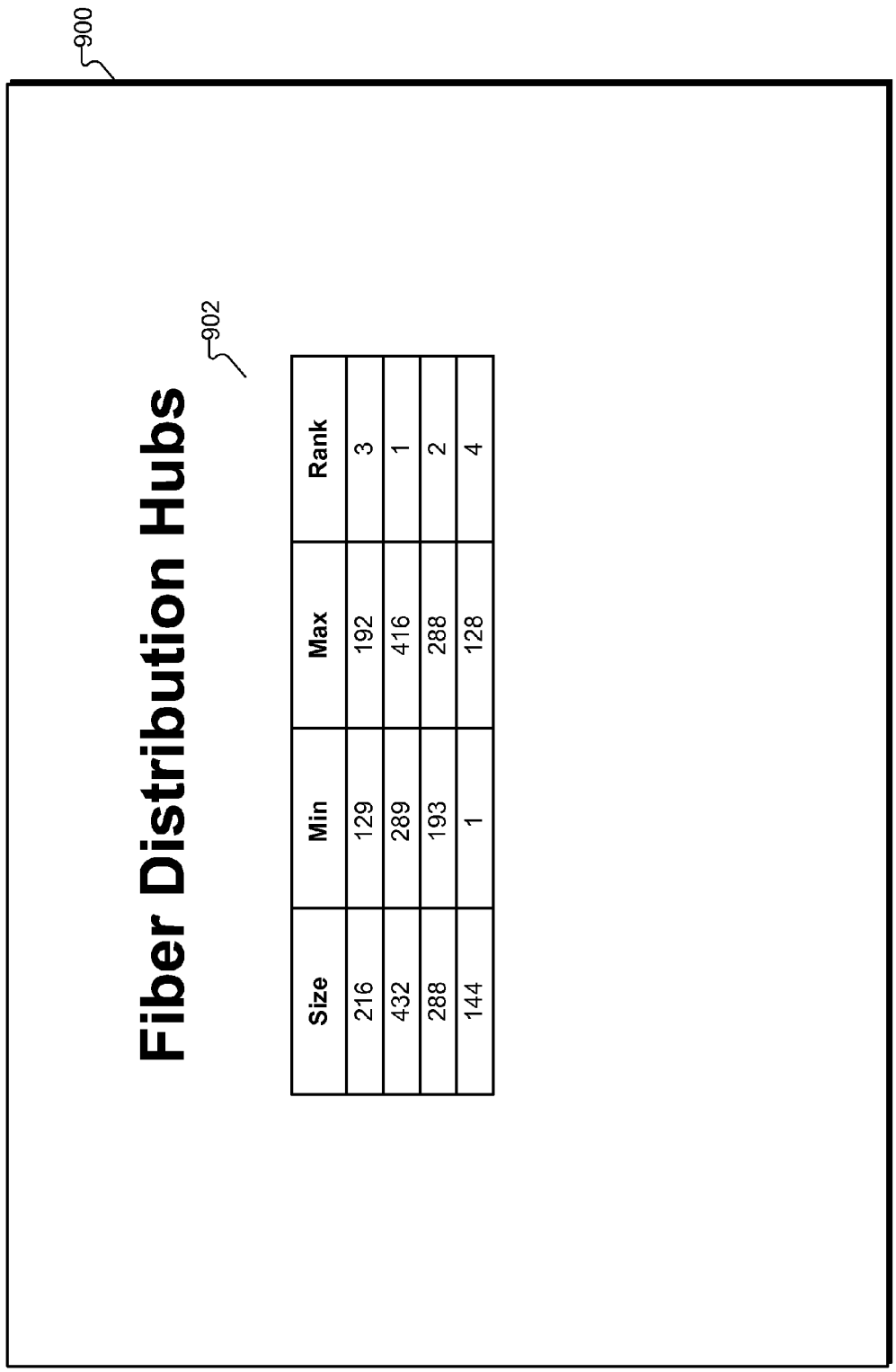
FIG. 9 shows an exemplary GUI that includes a fiber distribution hub table configured to facilitate user selection of a preferred use order of fiber distribution hub sizes according to principles described herein.

For example, FIG. 9 shows an exemplary GUI 900 that may be provided by system 200 and that includes a fiber distribution hub table 902 configured to facilitate user selection of a preferred use order of fiber distribution hub sizes. As shown, table 902 may indicate a size of a plurality of possible fiber distribution hubs that may be used within the FTTP network. Each size represents a total number of customers (e.g., FTTP demand sites) that a corresponding fiber distribution hub is capable of serving. For example, the first entry within table 902 corresponds to a fiber distribution hub that has a size of 216. Table 902 may also indicate a user-imposed minimum and maximum number of customers that each fiber distribution hub size may serve. These minimum and maximum numbers may be specified by a user and may vary depending on the particular FTTP network implementation.

Table 902 also indicates a rank of each fiber distribution hub size. The rank may be specified by a user and refers to a preferred use order of each fiber distribution hub size. For example, a fiber distribution hub having a size of 432 is ranked number one in table 902. Hence, system 200 will attempt to use this size of fiber distribution hub whenever possible when modeling the FTTP network.

To illustrate an exemplary implementation of the hub size selection heuristic, system 200 may be configured to iteratively select various combinations of fiber distribution hub sizes for placement at various locations within the FTTP network. The selection may be based at least in part on the determined demand associated with each street segment and on the values included in table 902. With each iteration, system 200 may determine a total fiber demand associated with each street segment and/or a total cost associated with implementing the FTTP network. The process may be repeated until an optimal combination of fiber distribution hubs is obtained (i.e., until the total fiber demand is minimized and/or until a total cost associated with implementing the FTTP network is minimized).

Figure 10:
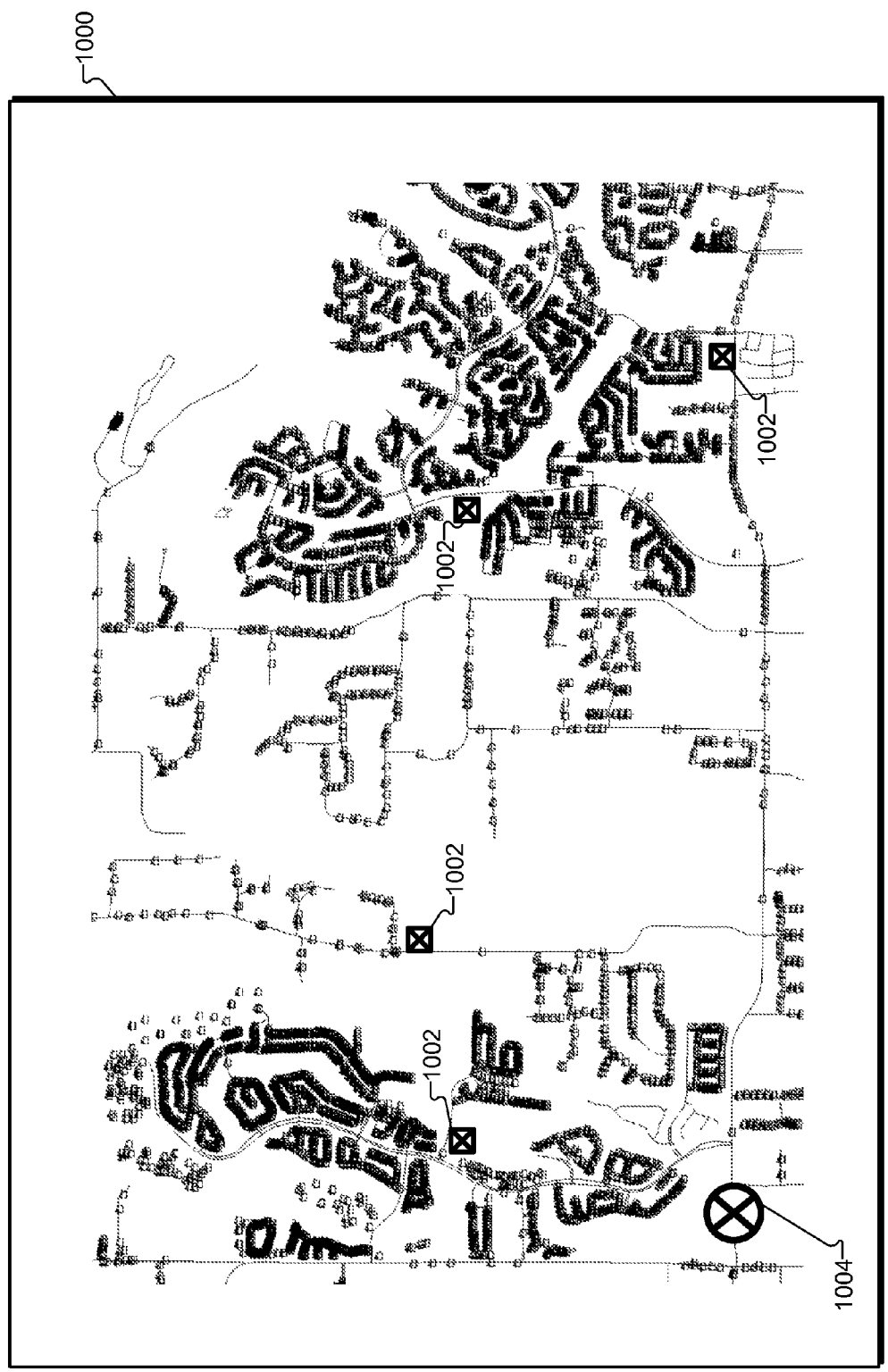
FIG. 10 shows an exemplary GUI that may graphically illustrate a placement of a plurality of fiber distribution hubs within the FTTP network according to principles described herein.

FIG. 10 shows an exemplary GUI 1000 that may be provided by system 100 and that may graphically illustrate a placement of a plurality of fiber distribution hubs within the FTTP network. As shown, a geospatial location of each fiber distribution hub may be represented by graphical symbols 1002. Each graphical symbol 1002 may be selected by a user to display or otherwise access information (e.g., size information, etc.) associated with its corresponding fiber distribution hub. FIG. 10 also shows that a geospatial location of the central office may be represented by graphical symbol 1004.

Once the demand associated with each street segment has been determined and the fiber distribution hubs placed, system 200 may automatically determine one or more standard fiber optic cable sizes to be used within the FTTP network, as described above. System 200 may also automatically calculate a cost of building the FTTP network. The calculation may be based on the automatically determined demand, the automatically determined geospatial location and size of each of the plurality of fiber distribution hubs, and/or any other factor as may serve a particular implementation.

To illustrate, FIG. 11 shows an exemplary GUI 1100 that may be provided by system 200 and that includes various model results 1102. As shown, various statistics calculated by system 200 may be included within the model results 1102. For example, a total number of SDUs, MDUs, direct fiber demand sites, and fiber distribution hubs may be included within model results 1102. A total number of feet of feeder fiber demand and distribution fiber demand may also be included within model results. Based on this demand, system 200 may calculate and include within model results 1102 a total cost of building the modeled FTTP network. It will be recognized that the model results 1102 shown within GUI 1100 are merely exemplary of the many different model results that may be presented by system 200 and that they may be presented in any of a number of different manners and formats as may serve a particular implementation.

In some examples, the FTTP network modeling methods and systems described herein may be used to determine whether it is cost effective to provide FTTP service to a particular FTTP demand site. To illustrate, a particular FTTP demand site may be located relatively far away from the central office and/or from other FTTP demand sites. System 200 may be used to determine whether it is more cost effective to provide FTTP service to the particular FTTP demand site or to provide some other type of network service (e.g., wireless service).

To this end, system 200 may receive input representative of a geospatial location of the particular FTTP demand site, automatically determine a least cost path along one or more of the street segments for the particular FTTP demand site to the central office, automatically calculate, based on the least cost path, a cost associated with providing fiber optic service to the particular FTTP demand site, and automatically determine, based on the cost, a feasibility of providing the fiber optic service to the particular FTTP demand site. For example, if the cost of providing service is too high, system 200 may determine that it would be more feasible from a cost perspective to provide some other type of network service to the FTTP demand site.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 12:
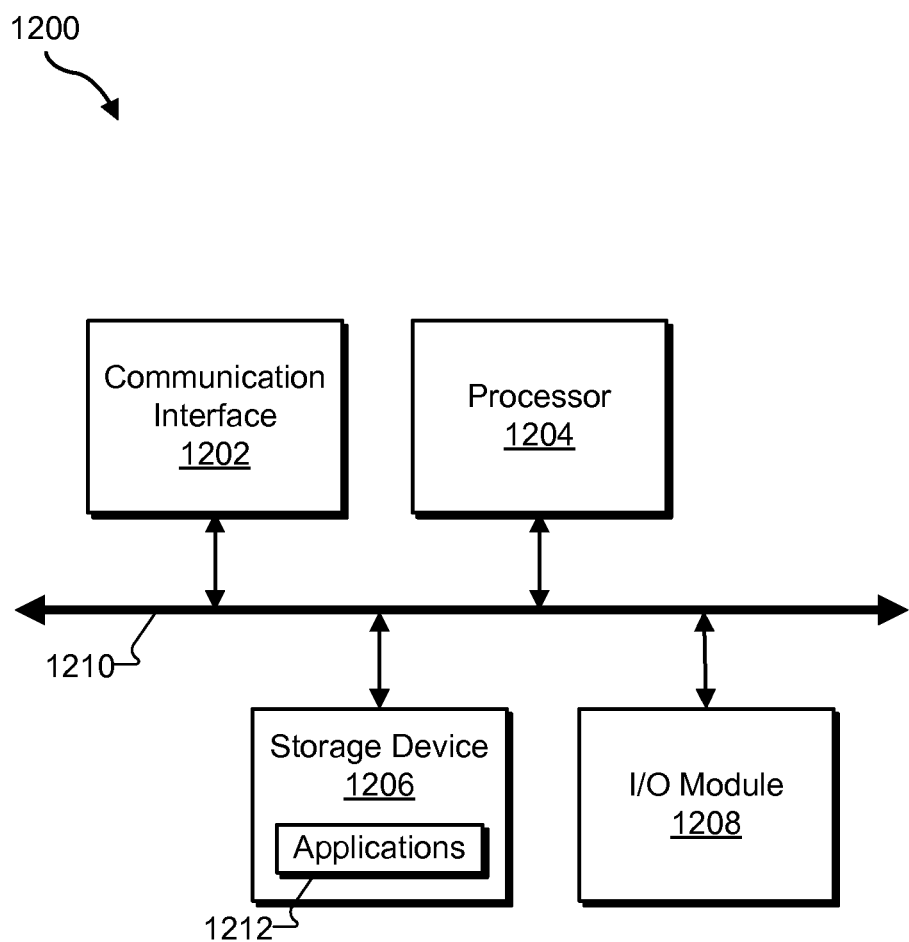
FIG. 12 illustrates an exemplary computing device according to principles described herein.

FIG. 12 illustrates an exemplary computing device 1200 that may be configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1206. For example, data representative of one or more executable applications 1212 configured to direct processor 1204 to perform any of the operations described herein may be stored within storage device 1206. In some examples, data may be arranged in one or more databases residing within storage device 1206.

I/O module 1208 may be configured to receive user input and provide user output and may include any hardware, firmware, software, or combination thereof supportive of input and output capabilities. For example, I/O module 1208 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1208 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the modules described herein may be implemented by or within one or more components of computing device 1200. For example, one or more applications 1212 residing within storage device 1206 may be configured to direct processor 1204 to perform one or more processes or functions associated with path module 202, demand module 204, fiber distribution hub selection module 206, cable size management module 208, and/or cost module 210. Likewise, storage module 212 may be implemented by or within storage device 1206.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A computer-implemented method comprising:
   assigning, by a processor included in a fiber to the premises ("FTTP") network modeling system, a cost factor to each of a plurality of street segments within a geospatial polyline map of a fiber optic network service area, each street segment within the plurality of street segments being a potential path segment along which one or more fiber optic cables are to be run in an FTTP network;
   receiving, by the processor included in the FTTP network modeling system, input representative of a geospatial location of each of a plurality of FTTP demand sites;
   automatically determining, by the processor included in the FTTP network modeling system, a least cost path along one or more of the street segments for each of the FTTP demand sites to a central office included in the FTTP network in accordance with the assigned cost factors;
   automatically determining, by the processor included in the FTTP network modeling system based on the geospatial location of each of the FTTP demand sites and on the automatically determined least cost paths, a demand associated with each street segment included in the plurality of street segments;
   automatically determining, by the processor included in the FTTP network modeling system based on the automatically determined demand associated with each street segment included in the plurality of street segments and in accordance with a predetermined hub size selection heuristic, a geospatial location and a size of a plurality of fiber distribution hubs to be included in the FTTP network; and
   presenting, in a graphical user interface by the processor included in the FTTP network modeling system, data representative of at least one of the demand associated with each street segment, the geospatial location of the plurality of fiber distribution hubs, and the size of the plurality of fiber distribution hubs.

2. The method of claim 1, further comprising automatically determining, by the FTTP network modeling system based on the automatically determined demand associated with each street segment included in the plurality of street segments, one or more standard fiber optic cable sizes associated with the street segments.

3. The method of claim 1, further comprising automatically calculating, by the FTTP network modeling system, a cost of building the FTTP network based on the automatically determined demand and the automatically determined geospatial location and size of each of the plurality of fiber distribution hubs.

4. The method of claim 1, further comprising:
   receiving, by the FTTP network modeling system, input representative of a geospatial location of a particular FTTP demand site;
   automatically determining, by the FTTP network modeling system, a least cost path along one or more of the street segments for the particular FTTP demand site to the central office;
   automatically calculating, by the FTTP network modeling system based on the least cost path for the particular FTTP demand site, a cost associated with providing fiber optic service to the particular FTTP demand site; and
   automatically determining, by the FTTP network modeling system based on the cost, a feasibility of providing the fiber optic service to the particular FTTP demand site.

5. The method of claim 1, wherein the assigning of the cost factors to the plurality of street segments comprises:
   receiving user input representative of a particular cost factor included in the assigned cost factors and an identification of a particular street segment included in the plurality of street segments; and
   assigning, in accordance with the received user input, the particular cost factor to the particular street segment.

6. The method of claim 1, wherein the assigning of the cost factors to the plurality of street segments comprises automatically determining a value of at least one of the cost factors based on one or more geospatial properties of at least one of the street segments.

7. The method of claim 1, wherein the automatically determining of the least cost path along one or more of the street segments for each of the FTTP demand sites to the central office is performed within a predetermined optical limit constraint associated with the FTTP network.

8. The method of claim 1, further comprising:
   receiving, by the FTTP network modeling system, input representative of a preferred use order of fiber distribution hub sizes;
   wherein the predetermined hub size selection heuristic is based on the preferred use order of fiber distribution hub sizes.

9. The method of claim 1, further comprising providing, by the FTTP network modeling system, an output file comprising data representative of the automatically determined demand associated with each street segment and the automatically determined geospatial location and size of the plurality of fiber distribution hubs, wherein the output file is in MapInfo format.

10. The method of claim 1, wherein the plurality of FTTP demand sites comprise at least one of a single dwelling unit, a multiple dwelling unit, and a direct fiber site.

11. The method of claim 1, wherein the demand associated with a particular street segment included in the plurality of street segments is representative of a total number of FTTP demand sites served by one or more fiber optic cables associated with the particular street segment.

12. The method of claim 1, wherein the demand associated with each street segment included in the plurality of street segments comprises at least one of a feeder fiber demand, a distribution fiber demand, and a direct fiber demand.

13. The method of claim 1, wherein the input representative of the geospatial location of each of the plurality of FTTP demand sites is provided in a MapInfo database format.

14. A system comprising:
at least one computing device including a processor and comprising:
a path module configured to
assign a cost factor to each of a plurality of street segments within a geospatial polyline map of a fiber optic network service area, each street segment within the plurality of street segments being a potential path segment associated with a plurality of fiber optic cables along which one or more fiber optic cables are to be run in a fiber to the premises ("FTTP") network,
receive input representative of a geospatial location of each of a plurality of FTTP demand sites, and
automatically determine a least cost path along one or more of the street segments for each of the FTTP demand sites to a central office included in the FTTP network in accordance with the assigned cost factors;
a demand module communicatively coupled to the path module and configured to automatically determine, based on the geospatial location of each of the FTTP demand sites and on the automatically determined least cost paths, a demand associated with each street segment included in the plurality of street segments; and
a fiber distribution hub selection module communicatively coupled to the path module and the demand module and configured to automatically determine, based on the automatically determined demand associated with each street segment included in the plurality of street segments and in accordance with a predetermined hub size selection heuristic, a geospatial location and a size of a plurality of fiber distribution hubs to be included in the FTTP network.

15. The system of claim 14, further comprising a cost module communicatively coupled to the demand module and the fiber distribution hub selection module and configured to automatically calculate a cost of building the FTTP network based on the automatically determined demand and the automatically determined geospatial location and size of each of the plurality of fiber distribution hubs.

16. The system of claim 14, wherein the path module is configured to assign the cost factors to the plurality of street segments by:
receiving user input representative of a particular cost factor included in the assigned cost factors and an identification of a particular street segment included in the plurality of street segments; and
assigning, in accordance with the received user input, the particular cost factor to the particular street segment.

17. The system of claim 14, wherein the path module is configured to assign the cost factors to the plurality of street segments by automatically determining a value of at least one of the cost factors based on one or more geospatial properties of at least one of the street segments.

18. The system of claim 14, wherein:
the fiber distribution hub selection module is further configured to receive input representative of a preferred use order of fiber distribution hub sizes; and
the predetermined hub size selection heuristic is based on the preferred used order of fiber distribution hub sizes.

19. A non-transitory computer-readable medium including instructions configured to direct at least one computing device to:
assign a cost factor to each of a plurality of street segments within a geospatial polyline map of a fiber optic network service area, each street segment within the plurality of street segments being a potential path segment along which one or more fiber optic cables are to be run in a fiber to the premises ("FTTP") network;
receive input representative of a geospatial location of each of a plurality of FTTP demand sites;
automatically determine a least cost path along one or more of the street segments for each of the FTTP demand sites to a central office included in the FTTP network in accordance with the assigned cost factors;
automatically determine, based on the geospatial location of each of the FTTP demand sites and on the automatically determined least cost paths, a demand associated with each street segment included in the plurality of street segments; and
automatically determine, based on the automatically determined demand associated with each street segment included in the plurality of street segments and in accordance with a predetermined hub size selection heuristic, a geospatial location and a size of a plurality of fiber distribution hubs to be included in the FTTP network.

20. The non-transitory computer-readable medium of claim 19, wherein the instructions are further configured to direct the at least one computing device to automatically calculate a cost of building the FTTP network based on the automatically determined demand and the automatically determined geospatial location and size of each of the plurality of fiber distribution hubs.

* * * * *